US 7,400,133 B2

Jul. 15, 2008

(12) United States Patent
Hollander et al.

(10) Patent No.: US 7,400,133 B2
(45) Date of Patent: Jul. 15, 2008

(54) SPEECH GENERATING METHOD FOR USE WITH SIGNAL GENERATORS

(75) Inventors: Milton Bernard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 689 days.

(21) Appl. No.: 10/839,096

(22) Filed: May 5, 2004

(65) Prior Publication Data
US 2004/0225503 A1 Nov. 11, 2004

(51) Int. Cl.
*G01R 11/04* (2006.01)

(52) U.S. Cl. .................. 324/157; 340/870.02

(58) Field of Classification Search .............. None
See application file for complete search history.

(56) References Cited

U.S. PATENT DOCUMENTS

| | | | | |
|---|---|---|---|---|
| 4,532,470 A | * | 7/1985 | Wiesmann ............... | 324/76.11 |
| 4,563,770 A | * | 1/1986 | Lemelson et al. ......... | 704/270 |
| 4,727,310 A | * | 2/1988 | Hashimoto et al. ....... | 324/157 |
| 4,949,274 A | * | 8/1990 | Hollander et al. ........ | 324/142 |
| 5,392,282 A | * | 2/1995 | Kiema ..................... | 370/491 |
| 5,583,801 A | * | 12/1996 | Croyle et al. ............ | 702/115 |
| 5,651,056 A | * | 7/1997 | Eting et al. ............. | 379/88.01 |
| 5,821,759 A | * | 10/1998 | Scaman et al. ........... | 324/529 |
| 5,978,738 A | * | 11/1999 | Brown .................... | 702/3 |
| 6,043,640 A | * | 3/2000 | Lauby et al. ............. | 324/127 |

* cited by examiner

*Primary Examiner*—Ha Nguyen
*Assistant Examiner*—Richard Isla-Rodas
(74) *Attorney, Agent, or Firm*—William A. Drucker

(57) ABSTRACT

A speech module (13) comprises an independent self-contained connector module or unit which is adapted to be releasably connected in series with the input to, or output from, a signal sensing apparatus (1). The module is provided with plugs and/or sockets (14a,14b,20) compatible with those of the apparatus (1) so that the module (13) is capable of forming a connector in series with the signal input or output leads (7,8,14). The module is further provided with plugs and/or sockets (30,31) and leads (3,4) to replace the signal input or output leads (7,8,14). The module is connected to a data output socket (12) by means of a lead (14); in the alternative, it is connected to the input connectors (30,31) of the apparatus and is further connected by leads to probes (3,4) equivalent to the standard probes used by the apparatus, which is preferably an electrical multimeter.

1 Claim, 3 Drawing Sheets

UNIVERSAL VOICE MODULE
FUNCTIONAL BLOCK DIAGRAM

SPEECH GENERATING METHOD FOR USE WITH SIGNAL GENERATORS

FIELD OF THE INVENTION

The present invention relates to speech generating means or synthesizers which generate verbal announcements in response to sensed electrical signals.

The invention is particularly but not exclusively applicanle to speech synthesizers for use with signal sensing apparatus or instrumentation such as meters for testing physical parameters of electrical circuits or components.

BACKGROUND ART

U.S. Pat. No. 4,949,274 (Omega Engineering, Inc.), incorporated herein by reference, discloses such test meters, and in particular electronic multimeters, which measure various parameters such as electric current, voltage and resistance, via hand-held measurement probes which are brought into contact with circuits or components to be tested. The multimeters visually display the sensed signals, i.e. the measured values or test results. The multimeters disclosed in this U.S. patent also have built-in speech synthesizers enabling the meters to speak the measured values in addition to displaying them visually. The synthesizer circuitry is designed to accommodate a replaceable speech module, so that different language modules may be inserted into the meters. This allows the meter design to remain the same whilst enabling the language spoken by the meter to be changed to suit the country in which the meter is to be used.

Other forms of apparatus which incorporate speech synthesizers include vehicle navigation systems which give the driver verbal route directions, and aircraft instrument systems which give the pilot verbal warnings and instructions for corrective procedures.

DISCLOSURE OF THE INVENTION

It is an object of the present invention to provide means for enabling a more flexible and improved utilisation of synthesized speech.

It is a further object of the present invention to provide means for enabling meters or other signal sensors which are not designed to talk, to be readily upgraded, without the need for any design changes, to provide this capability.

It is another object of the present invention to provide means for enabling the generation of synthesized speech announcements which include or comprise information not otherwise displayed or provided by an associated meter or other signal sensing apparatus, and/or which is beyond the capability of such apparatus.

In its broadest aspect, the present invention provides a portable module incorporating speech-generating means, which is releasably connectable as an external accessory to signal sensing apparatus, and is adapted to generate speech signals in dependence upon the signals sensed by the signal sensing apparatus.

The invention also provides a speech module as just defined, in combination with signal sensing apparatus.

The speech module embodying the invention comprises an independent self-contained connector module or unit which is adapted to be releasably connected in series with the input to, or output from, the signal sensing apparatus. The speech module incorporates connectors (e.g. plugs and/or sockets) compatible with those of the apparatus so that no modifications of the wiring or circuitry of the apparatus are necessary.

The speech module is "transparent" in that the input to and/or output from the apparatus is unaffected by the interposition of the module. Thus, in a first embodiment, the module forms a connector or junction in series with signal input (or output) means such as one or more of the signal input (or output) leads normally connected to the apparatus, or in a second embodiment, replaces the leads, to provide the apparatus, without further adaptation, with a speech enunciation capability.

In the first embodiment, the speech module is connectable to a test meter, such as a multimeter, in place of the standard or existing hand-held measurement probe or probes. For this purpose, the module is provided with or connected to output leads having connectors (e.g. plugs or sockets) matching those of the standard probe, which connect to the standard connectors (e.g. sockets or plugs) of the meter. The module is also provided with input leads forming or incorporating hand-held probes. The probes can be the existing standard meter probes if appropriate, or can be specific to the module and releasably or permanently connected to the module. The module and/or the probes incorporate manual switches for remotely controlling the operation of the module, and preferably also for remotely controlling the meter functions.

In the second embodiment, if the test meter or other apparatus incorporates as standard a data output connector (e.g. a socket) intended for connection to various peripheral devices, the speech module will be provided with an input lead having a compatible connector (e.g. plug) which plugs into the data output socket. The speech module is then used to generate speech announcements from the output data without disturbing the existing meter probes. Peripheral devices are then connected/reconnected to the meter output via the module as required, by plugging into a compatible socket in the module.

If the test meter or other apparatus incorporates as standard an additional alternative data input connector, or if the previously mentioned data output connector is a dual-purpose (i.e. input and output) connector, the speech module can be plugged into this connector. The sensed or detected signals will then be input to the meter via the speech module instead of via the probes.

The speech module circuitry will be designed to generate speech announcement signals representing the sensed or detected signals, i.e. synthesized speech readouts of the analog and/or digital test results displayed by the test meter or other apparatus. Additionally or alternatively, the module circuitry will be designed to generate speech announcement signals incorporating information and/or instructions derived from or processed from the sensed signals. These announcements can be spoken warnings and/or instructions if the sensed signals deviate from predetermined values or ranges, and/or can be the results of calculations or computations using the sensed signals, carried out by a microprocessor incorporated in the module circuitry. This information can be in addition to that which the basic meter or other apparatus itself is capable of providing and displaying.

The universal speech module can communicate with a PC (Personal Computer) through RS232, USB, Ethernet, or other means. One can program the speech module for the input type, engineering unit of scale, alarm set points, analog output, etc. from the PC. One can activate the speech function either on command or on a continuous basis. This activation can be done either locally from the module itself (Stand alone) or it can be done from a PC interface (Remotely).

The speech module will incorporate its own built-in audible enunciator, such as a loudspeaker, and/or means for connecting or transmitting its speech output signals, e.g. via wiring, or a radio or other wireless link, to a separate audible enunciator such as headphones or a speaker. The separate audible enunciator, instead of or in addition to the module, may include means, e.g. switches, to enable the operation and functions of the module and/or apparatus to be controlled remotely of the module.

The speech module will be of a size and shape to enable it to be conveniently held in the hand.

The speech module can incorporate its own internal power supply, e.g. battery. Alternatively, it could derive power from an external source such as a mains supply, or from the meter or other apparatus to which it is connected.

The speech module embodying the present invention possesses numerous advantages. It comprises an accessory which may be readily releasably connected to a variety of existing non-talking meters and other signal sensing apparatus, instrumentation or systems to complement and increase their capabilities, without requiring any modification of the meters, etc. themselves. The speech module is simply incorporated as a connector between the meter and its input or output lines.

BRIEF DESCRIPTION OF THE DRAWINGS

Reference will now be made to the accompanying drawings in which:—

DETAILED DESCRIPTION OF THE PREFERRED EMBODIMENT

Figure 1:
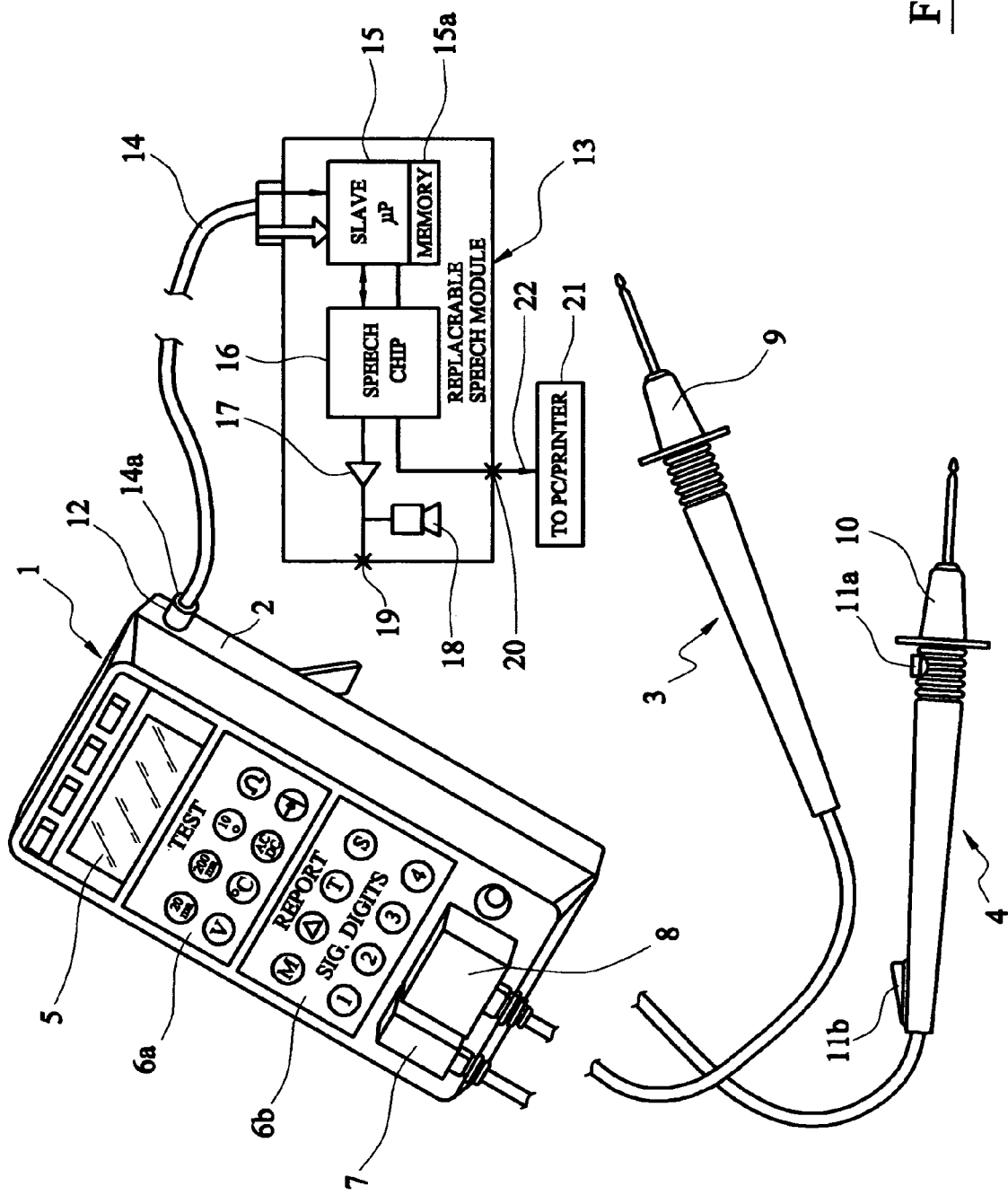
FIG. 1 is a perspective view showing the outward appearance of a multimeter to which a speech module embodying the present invention is connected in a first configuration.

FIG. 1 shows a test meter 1 basically similar to the multimeter described with reference to FIG. 1 of our U.S. Pat. No. 4,949,274, but without any built-in speech synthesizer circuitry.

The multimeter 1 includes a housing 2, and is operable by two hand-held contact probes 3 and 4. Contact probe 3 is a neutral, reference or "cold" probe and is used to contact the negative or ground test point of a circuit under test, whilst probe 4 is the live, sensing or "hot" probe which is used to contact a live or positive test point.

The housing 2 contains known meter circuitry including a processor (not shown), a visual display such as a digital LCD display 5, and function select button switches 6a and 6b. The upper rows of buttons 6a are test format buttons which enable the user to select the particular parameter to be measured (e.g. including voltage, current, resistance and temperature); the scale or range to be used (e.g. including volts or millivolts); and any other function defining a parameter test procedure which is required by the meter circuitry to accurately measure and report test results.

The lower rows of buttons 6b are report format buttons which enable the user to select the desired report format, e.g. store measured values in memory for later display/recording, continuous readout, periodic readout, number of significant digits, and any other functions defining reporting procedures that may be required.

The contact measurement probes 3 and 4 are removable, and are connected to the meter circuitry via flexible leads and plugs 7 and 8 which plug into corresponding sockets in the meter housing. At their free ends, the probes have handles 9 and 10 to facilitate manual manipulation. The handle 10 of the hot probe 4 incorporates a control unit including switches 11a, 11b. The control unit is connected to the processor or other circuitry in the meter housing via multiple conductors in the probe, to enable the user optionally to change the meter functions remotely via the handle 10 instead of directly via the meter switches 6a, 6b. As disclosed in our aforesaid U.S. patent, the switches 11a, 11b are push-button selector switches which, each time that they are pressed, trigger the processor to cycle or advance stepwise through the various options of the respective test format and report format.

The meter also incorporates a data output connector 12, such as a telephone jack socket or RS 232 port, for enabling test results to be periodically or continuously transmitted to a peripheral device.

As shown in FIG. 1, a speech module 13 embodying the invention is connected to the data output socket 12 by an input lead 14 having appropriate connector plugs 14a, 14b at its opposite ends. The module, the circuitry of which is shown diagrammatically, incorporates a microprocessor 15 and associated memory 15a, connected to a speech synthesizer chip 16. The chip 16 is connected to an amplifier 17 which drives a loud speaker 18 or other electro acoustic transducer for enunciating audible speech. A first connector, e.g. socket 19, is provided for connection to an external electro acoustic transducer, such as headphones (not shown). A second connector, e.g. socket 20, is provided for connection to one of a number of standard peripheral devices 21, e.g. a printer, recorder, data logger, or processor for storage/analysis, which would, in the absence of the speech module, normally have been plugged into the data output socket 12 via an appropriate lead 22.

In a basic form of speech module, the microprocessor 15 stores the meter data, i.e. the measured values/test results, and translates the data into signals that causes the speech chip 16 to enunciate, via the speaker, headphones, etc., the data visually displayed on the meter display 5. However, the microprocessor can also be programmed and/or controlled to cause the speech chip 16 to enunciate data or information not displayed by the visual display 5, or in greater detail. For example, the enunciated data can give the measured values to more or less significant digits, and/or can give the data in different test or report modes, and/or can be the result of further processing by the microprocessor. Additionally or alternatively, the enunciated data can take the form of verbal warnings and/or instructions to the user, if the data received from the meter deviates from predetermined acceptable parameters, such as predetermined values or ranges. The speech module thus possesses additionally capabilities not possessed by the meter itself.

In order to select the required output, the speech module 13 incorporates appropriate test and/or report format switches or key pads (not shown) similar to those (6a, 6b) incorporated into the meter 1. Switch means are also provided to activate and deactivate the synthesized speech facility. Furthermore, the speech module 13 can also incorporate other facilities of the meter itself, such as a visual display. Incorporation/duplication of meter facilities in the speech module are particularly advantageous if the speech module and the user are located remote from the meter 1. In this event, it will be appreciated that the data input line 14 to the speech module could be replaced by a radio or other wireless link. This can be effected, for example by a transmitter or transceiver plugged into the meter data output socket 12, and a receiver or transceiver incorporated in the speech module, or plugged into the speech module data input socket.

Figure 2:
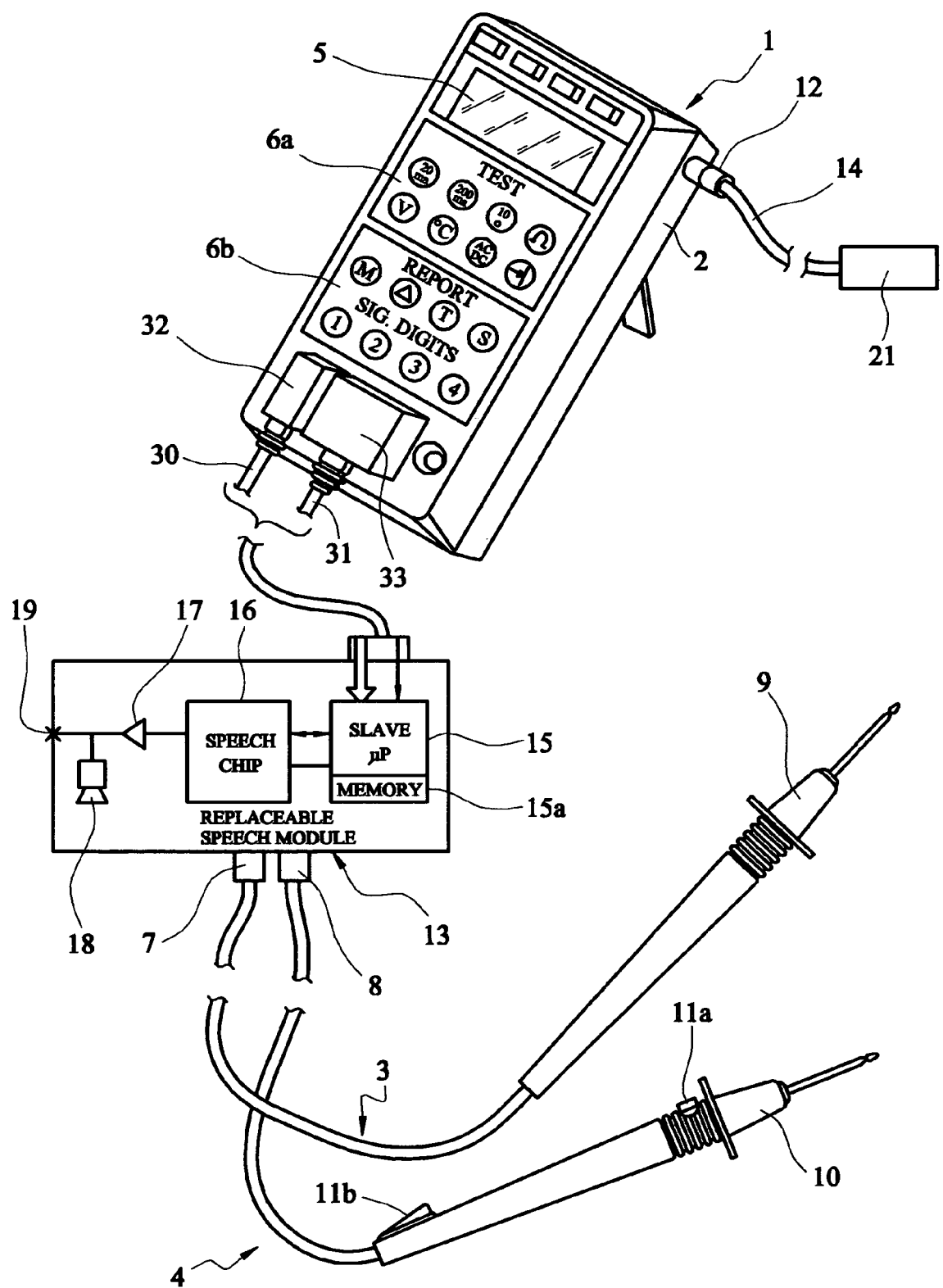
FIG. 2 is a perspective view similar to FIG. 1 showing a speech module embodying the invention connected to a multimeter in a second configuration.

FIG. 2 shows an alternative configuration in which the speech module 13, which may be the same as that described in reference to FIG. 1, forms a connector between the meter 1 and probes 3 and 4. The module will incorporate connectors, i.e. sockets compatible with the probe plugs 7 and 8, to receive the latter plugs, and leads 30, 31 incorporating plugs 32, 33 compatible with the corresponding sockets in the meter, to connect the module to the meter. It will be understood from the previous discussion how the module functions and interacts with the meter, and it is considered to be unnecessary to repeat this discussion.

In the embodiment of FIGS. 1 and 2 the control unit, i.e. the switches 11a, 11b, incorporated in the handle of the standard hot probe 4, are used to activate and deactivate the speech module, and select and control the functions of the speech module via its microprocessor 15, instead of or in addition to selecting and controlling the functions of the meter 1 via its internal processor. The additional function options of the speech module are accommodated by appropriate programming of the microprocessor 15. The microprocessor 15 can also interact with and/or control the meter processor to select and control the various speech module functions and/or meter functions as required. However, if in practice the hot probe 4 does not incorporate a control unit, or the standard control unit is incompatible with the speech module, the standard meter probe 4 will be replaced by a modified probe specifically designed for the latter purpose, incorporating an appropriate control unit including switches and wiring. Alternatively, it is envisaged that an appropriately designed separate control or adapter unit could be plugged in between the standard hot probe and the meter. The standard cold probe 3 used with meters is generally a relatively simple single-conductor probe devoid of switches, which should therefore be compatible with, and usable with, the speech module.

The speech module 13 can be relatively unsophisticated, as described earlier with reference to FIGS. 1 and 2. However, as also outlined earlier, the module can include additional capabilities and functions, and can be adapted to be compatible with a wider range of meters or other signal sensing apparatus or instrumentation. Such a speech module is shown schematically in block diagram form in FIG. 3.

Figure 3:
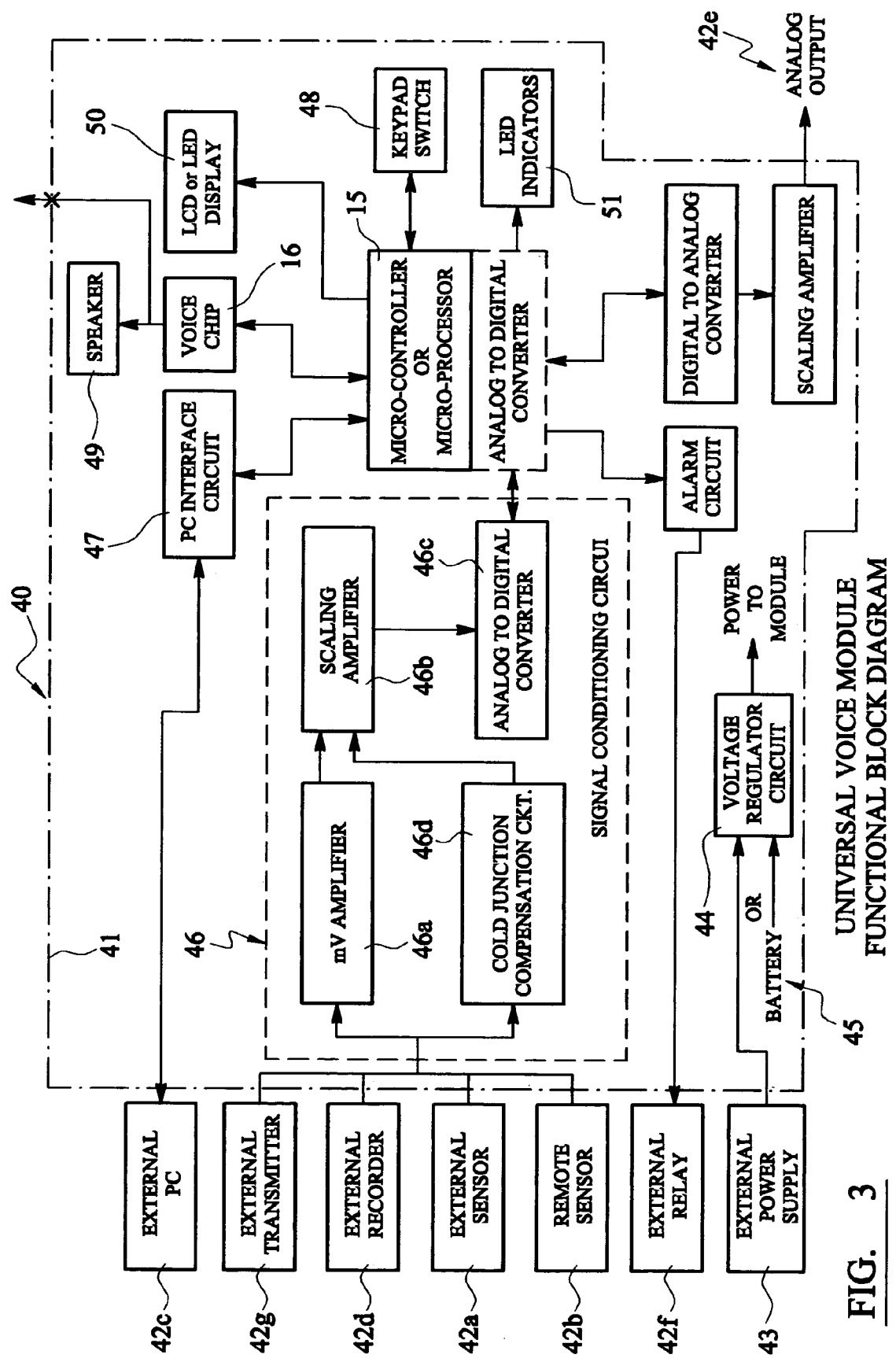
FIG. 3 is a circuit block diagram of another embodiment of speech module.

The internal circuitry of the speech module 40 shown in FIG. 3 is contained within a module housing indicated schematically by the dot-dash line 41. Various internal input and output devices are connectable to the speech module to provide inputs to, or receive outputs from, the module. The interconnections are shown schematically, spaced apart, although some of them can in practice be incorporated within common connectors.

The devices which provide inputs to the speech module can include voltage etc. sensors (e.g. contact probes), temperature sensors (e.g. thermocouples), pressure sensors, frequency sensors, flow sensors, pulse sensors, humidity sensors, pH sensors, conductivity sensors and many other types of sensors or detectors connected directly to the speech module, and represented generically in FIG. 3 by external sensor 42a. Alternatively, the sensors can be connected to the speech module remotely, via an associated standard meter or other apparatus/instrumentation, represented generically in FIG. 3 by remote sensor 42b. If the latter input devices incorporate processors, they will also be connected to the module, as represented by the external PC 42c.

An external power supply 43 is connectable to the speech module to power the module via an internal voltage regulator circuit 44, although alternatively or as a back-up, the module can be powered by an internal battery 45.

The devices which receive outputs from the speech module can include meters or other apparatus/instrumentation incorporating processors, connected to the module (as in the FIG. 2 configuration) and also represented by the external PC 42c. Peripheral devices such as data loggers, panel meters, controllers, signal conditioners, printers and recorders (as in the FIG. 1 configuration), are represented generically in FIG. 3 by external recorder 42d. If the latter peripheral devices incorporate processors, they will also be connected to the module as represented by the external PC 42c. Similarly if the peripheral device is a computer for further conditioning/processing the module output, this will be connected to the module as represented by the external PC 42c. The foregoing apparatus/devices usually require a digital output from the module, but an analog output 42e can be provided, for example for driving analog devices such as an analog panel meter.

The output-receiving devices can also include an external relay 42f connectable to an internal alarm circuit. The relay, in operation will be connected to an audible or visible alarm which warns the user if a predetermined desired or undesired value or condition is sensed or is imminent.

The speech module circuitry incorporates a signal conditioning circuit 46 including a mV amplifier 46a, scaling and/or linearizing amplifier 46b and analog-to-digital converter 46c. The circuit 46 conditions the incoming signal, as is necessary with certain types of sensors, before it is applied to the module microprocessor/controller 15. The circuit 46 also incorporates a cold junction compensation circuit 46d which may be required as a reference when the input is derived from a temperature sensor such as a thermocouple. The manner in which this circuit functions will be apparent from U.S. Pat. No. 6,074,089 (Omega Engineering, Inc), incorporated herein by reference.

When the speech module is connected in the FIG. 1 configuration, the output signals from the meter processor, including the test results/measurements values and control signals from the meter and probe switches, are applied via an interface circuit 47 to the microprocessor 15. Additionally or alternatively, under the control of a module keypad switch device 48, the microprocessor, as explained earlier, translates the data into signals that cause the speech synthesizer or voice chip 16 to verbally enunciate, via an internal speaker 49, and/or an external speaker or headphones, etc., the data visually displayed by the meter, and/or warnings and/or instructions, and/or the results of computations/calculations carried out by the microprocessor. The microprocessor also drives an LCD or LED display 50 which visually displays, for example, the data displayed by the meter display 5. The microprocessor also controls various LED indicators 51 which identify, for example, the test/report functions selected, alarm conditions and low battery condition. The microprocessor also outputs data to the external peripheral devices, either via leads to the device 42d, or via an external transmitter 42g.

When the speech module is connected in the FIG. 2 configuration, the output signals from the external/remote sensors 42a and 42b are fed, optionally via the signal conditioning circuit 46, to the microprocessor 15. The speech synthesizer circuitry functions as described above, and the module output data is output, via the PC interface circuit 47 to the external PC 42c, which in this instance will be the meter processor. The speech module microprocessor 15 and the meter processor will interact/interface to effect the necessary test/report function selections, depending upon whether the selections are effected via the switches on the face of the meter, the speech module key pad, or the probe control unit switches.

The speech module is preferably able to enunciate in different languages. This can be achieved by the use of software, by the installation of interchangeable different language voice chips 16, or by using a multi-lingual voice chip.

The synthesized speech modules described and illustrated possess numerous advantages.

A speech module embodying the invention is capable of doing more than enunciate verbally what is seen on a meter, controller, readout device screen, a recorder, or graphic presentation device. It is capable of verbally providing instructions and information that cannot be displayed. For example, if a sensor is part of a heart-monitoring device, and there is no visual screen, a verbal indication of the pulse or erratic behavior thereof with instructions as to what steps are to be taken is essential. Similarly, if, for example, a device is used to measure temperature, not only can the temperature be verbally reported by the speech module in situations where there is not an opportunity to visually observe the indication, but also various steps to be taken can be stored in the module and verbally stated. The module can enunciate the time the information was provided audibly.

Another example is that if flow rate is being measured, the speech module can audibly indicate not only the flow rate, but also indicate the quantity of material that flows from Time A to Time B. The module can also be set to audibly give readings at particular time intervals as required, or to indicate the time to set or reset parameters. For example, the module could say:

"Its 2:15 p.m."

"The voltage is now 120."

"Reset voltage now."

An individual speech module can be used with or accommodate more than one type of signal. For example, a temperature control input device could also be used as a millivolt input device or a resistance-measuring device.

The speech module can contain a microprocessor and can be programmable by the use of software from a PC so as to provide different functions and settings. The module can also be programmable by external remote control as well as by internal and external controls.

The speech module can incorporate signal range adjustments such that it can provide a greater range of verbal enunciation than an indicator can display visually. For example a visual panel meter or controller can indicate temperature to a $10^{th}$ of a degree whereas the module can verbally indicate the temperature to a $100^{th}$ of a degree or even a $1000^{th}$ of a degree, even though it is not visually observable.

The speech module can also have the ability to perform certain functions internally that are not be part of the readout device or recorder. For example, if a simple circular chart recorder is recording temperature or pressure variations over time, the speech module could have a built-in on/off controller or Proportional Integral Derivative (PID) controller. Therefore, the module can add various control features to the readout or recording device as required.

The speech module can also possess storage capabilities, and include data logging functions and recording functions.

The speech module can be connectable to a PC with RS-232, RS-422 serial communications, Ethernet, RS-485 and RS-488 serial links, USB, and other links.

The speech module can have, in addition to speech outputs, both analog and digital outputs.

The speech module provides an enhancement to any device that indicates or records a parameter, in that it verbally enunciates and/or controls information, instructions and data that is not displayed by the controlling or recording device. The module can verbally give information in addition to that provided by the device to which it is connected, to enhance the performance of the device.

What is claimed is:

1. A method of operating a speech module (13/40) which module comprises a housing (2) which contains sensor input connector means (14) and signal output connector means (12); signal conditioning circuit (46); integral microprocessor (16); speech synthesizer circuit (16); loud speaker (18) or electro acoustic transducer (49); visual display (5) (50); electric power supply circuit (43/44/45); all of the above being connected to a signal sensing device (1) by the sensor input connector means (14), which method comprises the steps of (a) receiving radio signals from a sensor or transmitter and (b) converting said signals within said module into speech and (C) transmitting said signals to another device.

* * * * *